United States Patent
Marcus et al.

[15] 3,656,458
[45] Apr. 18, 1972

[54] MOLLUSC CLIP

[72] Inventors: Douglas Larry Marcus; Clifford L. Sayre, Jr., both of 1415 Ladd Street, Silver Spring, Md. 20902

[22] Filed: June 23, 1970

[21] Appl. No.: 49,096

[52] U.S. Cl. ............................................................. 119/4
[51] Int. Cl. ......................................................... A01k 61/00
[58] Field of Search ...................... 119/4; 24/137, 137.5, 138

[56] References Cited

UNITED STATES PATENTS 2,825,952  3/1958  Van Driel ................................ 24/138
2,931,086  4/1960  Rose ......................................... 24/137
3,203,061  8/1965  Thomas .................................. 24/137 X

FOREIGN PATENTS OR APPLICATIONS 1,320,608  1/1963  France

Primary Examiner—Hugh R. Chamblee
Attorney—Abraham A. Saffitz

[57] ABSTRACT

A clip for securing clutch material for the intensive farming or raft culture of sessile molluscs such as the oyster. The clip provides an opening for receiving and holding the clutch material. The clip is also provided with a keyhole shaped opening for receiving a supporting line whereby the clip and clutch material is attached thereto.

10 Claims, 8 Drawing Figures

PATENTED APR 18 1972

3,656,458

INVENTORS
DOUGLAS L. MARCUS
CLIFFORD L. SAYRE, Jr.

BY Abraham A. Saffitz
ATTORNEY

MOLLUSC CLIP

This invention relates to the use and configuration of an improved attachment device for use in the raft culture or intensive farming of sessile molluscs such as oysters.

Various forms of shellfish culture have been practiced for thousands of years. A current practice which has been very successful in Japan and has been introduced into the United States is called "raft culture." The cultch material on which oyster spat will set, or which may already have juvenile oysters attached thereto, is drilled and strung onto rods, wires, or other type lines and suspended from rafts or frames where the oysters are left to mature. Raft culture has many advantages such as better use of available growing areas because of the three-dimensional use of space, improved feeding and growth rate, better disposal of fecal and waste products, improved protection from some forms of predators and disease, and simplified harvesting as compared to the tonging or dredging of natural oyster bottoms. The use of strings also permits easy shifting from seeding to growing areas, moving from feeding areas to wintering areas in regions where there is a dormant period in the growth cycle, and periodic sunning or airing to reduce the growth of fouling. Cultch materials are typically old shells which are cheap and readily available and for which the shellfish larvae appear to have a natural preference. Various other materials have been employed for cultch material, but these are usually less successful in terms of the density of the set of spat and they are invariably more expensive than old shells. The feasibility of raft culture as a technique is well-documented, but the commercial success (particularly in the United States) depends on developing methods and materials which can compete economically with harvesters who can reap the natural crop on public beds with only a minimum investment of capital. The handling and hand labor costs (as well as material costs) of the raft culture technique must be reduced to a bare minimum if farming or intensive growing techniques are to compete successfully against the traditional harvesting methods.

Accordingly, the primary objectives of the present clip and its application are to reduce both the material and labor costs associated with the preparation, handling and harvesting of strings used in raft culture. The use of the clip avoids the necessity of using spacers (extra material and labor) and eliminates the drilling operation.

Other advantages and features will be apparent from the following description, and the figures of the attached drawing wherein.

Although various materials might be suitable for the clip, common metals are not recommended. Metals may corrode. Certain metallic ions in solution may inhibit the set of spat and are known to be ingested, retained and concentrated by the shellfish to the detriment of good growth and taste of the product. The deflection of the clip due to the insertion of the oyster hinge produces strains which might lead to stress-corrosion cracking in some metals. However, metals which are resistant to corrosion, such as the stainless steels and similar metals may be utilized, especially in fresh waters or the like. Plastics such as polyethylene, polyvinylchloride or polystyrene are recommended as suitable materials. Another suitable material is asbestos impregnated with cement, such as Portland cement or epoxy resin. One of the merits of the design is its flat shape and uniform thickness which would permit production by punching out of sheet stock as well as molding by any of the common methods in simple dies. Another merit is the fabrication from a single piece which simplifies production and eliminates the need for assembly.

Figure 1:
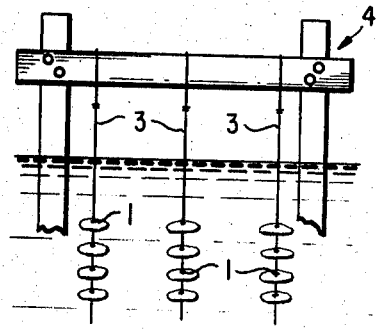
FIGS. 1 and 1a illustrate the general arrangement used in raft culture.
Figure 1A:
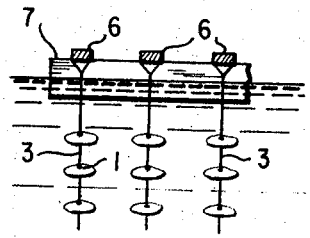

With particular reference to the drawings, FIGS. 1 and 1a illustrate the present art of oyster culture. The old shells 1, or similar, carry cultch material, have drilled holes 2 therein by which the material may be strung onto lines, wires or rods 3. The strings of cultch material are suspended in appropriate water areas from frame work 4 anchored in the water bed, as illustrated in FIG. 1. FIG. 1a shows the strings of cultch material suspended from supporting means 6 fastened to an anchored float or raft or similar support means 7.

Figure 2:
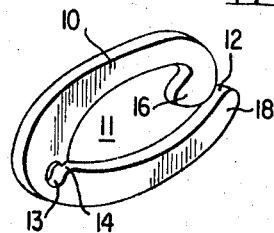
FIG. 2 is a perspective top view of the proposed clip.

Referring to FIG. 2, the clip is a unitary structure, either stamped out from sheet material, or molded, and having a generally rectangular cross section, as illustrated in the figure. The clip comprises a body 10, having an opening 11 therein. Opening 11 is provided with an entrance portion 12. Remote from entrance 12 a hole or aperture 13 is provided in the body. A narrow slot formation 14 connects hole 13 with opening 11, whereby means 13 and 14 form a keyhole formation. If desired, slot 14 may connect hole 13 to the outer periphery of body 1, as illustrated.

Body 10 terminates at one end in a hook formation 16 which lies opposite wall portion 18 of the body, the hook and wall portion defining relatively narrow entrance 12.

Figure 5:
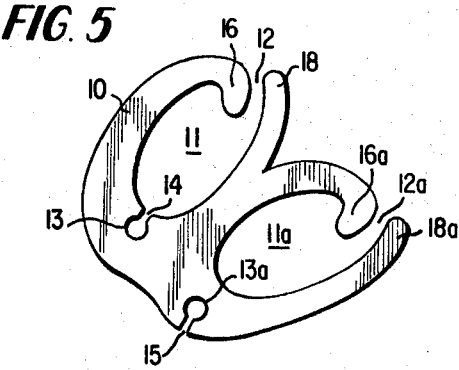
FIG. 5 is a top view of a clip having multiple openings for a number of cultch material pieces.
Figure 6:
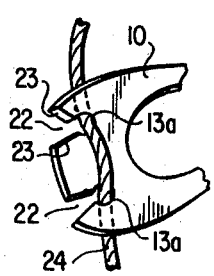
FIG. 6 is a plan view of a further modification of the clip's securing means to a line.

The clip may also be fabricated by extruding the desired plastic in a body having a cross-sectional configuration of the clip illustrated in FIGS. 2, 5 and 6. After, or as, the body is extruded, it may be cross sectionally cut or sliced to form individual clips.

In use, the clip is strung on the supporting rod, wire or line means in strings by moving the clip into the line 3 through entrance 12 and forcing the line through slot 14 to bring the line into hole 13. The formation of means 13 and 14 within the body provides a spring-like action whereby slot 14 yields to permit passage of the line means into hole 13.

Figure 4:
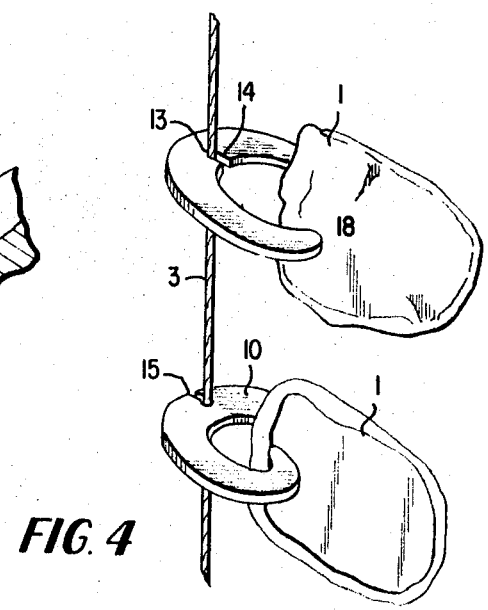
FIG. 4 illustrates the clip in use.

In lieu of slot 14 connecting hole 13 to opening 11, a slot 15 may be used to connect hole 13 to the outer periphery of body 10, as illustrated in FIGS. 4 and 5. The outer location of slot 15 permits the attachment or detachment of the clip to line 3 without disturbing the cultch material.

FIG. 6 shows a further modification of the line securing means. Two adjacent holes 13a are formed in the clip with outer peripheral slots 22. Slots 22 have inclined sides 23 to accommodate lines of different diameters. The clip is secured to its line 24 by passing the line serially through both means 13a–22, as illustrated in FIG. 6. The double securing means 13a–22 makes the agreement between the hole size and line diameter less critical. Hence, one size of clip securing means could be used with a variety of line diameters.

By being able to fasten directly and securely to the line the use of drilled holes and hence the conventional drilling operation is eliminated. If the diameter of hole 13 is properly chosen, the clip will be held firmly to the supporting rod, wire, or line, and be maintained in such position against normal forces. The use of spacers to separate the shells and the operation of threading the spacers is eliminated. Spacing is an important factor to provide room between adjacent clusters of oysters to permit optimum growth. Some growers economize by eliminating spacers because the shells are cheaper and the assembly without spacers is simpler. However, in addition to crowding for food, unspaced clusters of juvenile oysters are liable to damage by abrasion and being knocked about by other clusters which are too close. The location of keyhole means 13–14 in the interior of the clip has the advantage of preventing the clip from falling off of the supporting line even if the clip works loose (although the spacing benefits would obviously be lost). The selection of some types of plastic lines for the support string will be a plastic which would swell due to water absorption, thus causing the hole in the clip to hold the line more securely after immersion.

The shell or similar cultch material is attached to the clip by inserting the shell within entrance 12 so that it is held in position by the clamping effect of hook 16 and wall portion 18 thereon. The configuration of the body structure with opening 11 therein is such that it acts like a spring to exert a holding or clamping force on the portion of the cultch material between hook 16 and wall 18.

Figure 3:
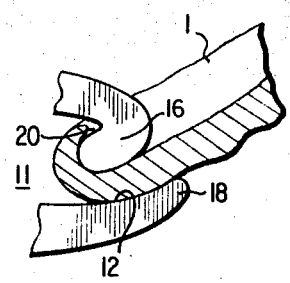
FIG. 3 is a partial cross section through a shell and clip illustrating the unique attachment feature.

The particular shape of the engaging portion of the hook which is illustrated in FIG. 3 solves a very difficult problem. Many shells, oysters in particular, lack uniformity in size, shape, and thickness. The design of the present clip takes advantage of a feature which all bivalve molluscs have in common — the hinge. At the hinge location 20 the shells have a recessed, curved section. The shape of the hook of the clip uses this feature to lock the clip to the recessed portion within the shell and to the outer side of the shell more securely than the simple pinching action of means 16 and 18 applied to the main body of the shell. The cross section of the lower portion of hook 16 of the clip is rectangular, preferably square. This feature permits the end of the hook to be flexible and capable of deflection either in the plane of the clip or sideways. This flexible construction is such that the clip may be applied by inserting the hinge recess directly, or by sliding the clip on from the side — whichever method is easier for each particular shell. Hence, the clip is adaptable to a wide variety of types of shells. The width of entrance 12, that is, the space between hook 16 and wall 18 is such that the spring force of the clip will not cause the shell to cock parallel to the clip and thus slide out. The opposing surfaces of hook 16 and wall 18 will always be in alignment and thereby prevent shell cocking forces.

In some cases the present practice of raft culture uses shells to which spat or juvenile oysters have already become attached. The use of clips in such cases would reduce the handling time out of the water as well as avoid the damage and mortality hazard of the drilling operation. The harvesting of raft-grown oysters would be improved by the use of clips. Mature oysters could be removed easily and the supporting lines returned to the water to permit undersized oysters to grow. With drilled cultch material selective harvesting is obviously more complicated. The plastic clips should be reuseable since they are essentially inert material and not damaged by ordinary use. Occasionally marine fouling may make some clips unfit for further service or breakage may occur during harvesting, but these are minor hazards. If polyethylene or polypropylene, or similar material, is used for supporting the strings, entire arrays of lines and clips might be reused. Experiments with these plastic lines have shown no loss of strength in oyster support strings over periods as long as 4 years — except for cases of abrasion against some adjacent structure. Fixing of the clip to the line also avoids parting of the support lines from abrasion due to wave or other motion which causes loose drilled shells to move up and down thus abrading the support line.

A clip with two or more sets of openings and hooks would be an obvious improvement for use with small shells or where denser populations of growing oysters were feasible. Such clip means is illustrated in FIG. 5, wherein body 10, in addition to means 11, 12, 13, 14, 16 and 18, is formed with a second set of like means 11a, 12a, 13a, 16a and 18a whereby the second set may accomodate a second shell. Means 13a and slot 15 are provided for the additional set, but it may be eliminated, if so desired, since only one means 13–14 is necessary for attachment of the multiple clip. Similarly, additional sets of means 11, 12, 16 and 18 may be provided in body 10 to hold additional cultch material.

A clip having the configuration of the disclosed clip may also be fabricated from suitable corrosion resistant wire or metal rodding. The wire needs to be bent to the disclosed configuration, that is, to form opening 11, slot 14, hole 13, hook 16 and wall portion 18. A wire clip having the disclosed configuration will have spring-like characteristics for holding the clip properly spaced along the line and maintain the shell in the proper position. The wire clip configuration should be fabricated in such a fashion as to avoid crevices where oxygen depletion or corrosion concentration cells occur.

Figure 7:
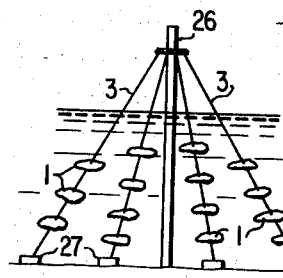
FIG. 7 is a view of a modified form of a raft culture arrangement.

FIG. 7 discloses an "umbrella" type arrangement of raft culture. A series of lines 3 radiate from a single pole-like support 26. The ends of lines 3 may be secured to support means 27.

Many other variations and modifications of this invention will be apparent to those skilled in the art. Accordingly, the foregoing description is intended to be construed as illustrative only, rather than limiting. The invention is limited only by the scope of the following claims.

What we claim is new and desire to secure by Letters Patent of the United States is:

1. A clip for attaching a cultch material to a supporting line means comprising a body, said body having an opening for the reception of the cultch material, said opening being provided with an entrance formed by two facing portions of the body, one portion having a hook configuration and the other opposing portion being a substantially straight wall portion, said straight wall portion having an end terminating beyond said hook configuration, said portions receiving and holding the cultch material therebetween, and securing means for attaching the clip to the supporting line means, said securing means having a hole in the body and a slot means narrower than the hole connecting said hole with the opening, thereby permitting a supporting line to pass through the entrance, opening and slot into the hole.

2. A clip as set forth in claim 1 wherein the cultch material is an old shell of a mollusc and the hook portion is shaped to enter and grasp the natural depression formed in the shell at the hinge point.

3. A clip as set forth in claim 1 wherein the body of the clip is formed of a resilient plastic material.

4. A clip as set forth in claim 1 wherein the clip is formed of a material comprising asbestos material impregnated with a cementitious material.

5. A clip as set forth in claim 1 wherein the body of the clip is formed of wire type material.

6. A clip as set forth in claim 1 wherein the plastic material is polyethylene.

7. A clip as set forth in claim 1 wherein the body is provided with additional formations, each formation providing an opening and opposing hook and wall portions forming an entrance thereto, to thereby provide additional reception openings for additional cultch material.

8. A clip as set forth in claim 1 wherein the slot means comprise sides inclined to each other with the wider spacing at the peripheral surface.

9. A clip as set forth in claim 8 wherein a duplicate hole and slot means are placed adjacent said hole and slot means and the line is serially passed through both holes.

10. A clip as set forth in claim 1 wherein a plurality of supporting lines are used for immersing a number of clips and their cultch material in water, said plurality of lines being supported at an end from a pole-like support and radiating therefrom in an umbrella-like fashion.

* * * * *